US005946017A

United States Patent [19]

Carley

[11] Patent Number: 5,946,017
[45] Date of Patent: *Aug. 31, 1999

[54] SINGLE PASS ELECTROPHOTOGRAPHIC COLOR PRINTING

[75] Inventor: Adam L. Carley, Windham, N.H.

[73] Assignee: Oak Technology, Inc., Sunnyvale, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/586,962

[22] Filed: Jan. 16, 1996

[51] Int. Cl.[6] .......... B41J 2/385; G01D 15/06; G03G 15/01

[52] U.S. Cl. .......... 347/115; 347/116; 347/118; 399/39

[58] Field of Search .......... 347/115, 116, 347/117, 118, 232; 399/39

[56] References Cited

U.S. PATENT DOCUMENTS

| | | | |
|---|---|---|---|
| 2,752,833 | 7/1956 | Jacob . | |
| 2,968,552 | 1/1961 | Gundlach | 96/1 R |
| 3,741,760 | 6/1973 | Snelling | 355/3 P |
| 3,857,549 | 12/1974 | Snelling | 355/3 P |
| 3,924,945 | 12/1975 | Weigl | 355/10 |
| 4,060,321 | 11/1977 | Butement | 355/8 |
| 4,167,326 | 9/1979 | Payne | 355/16 |
| 4,289,837 | 9/1981 | Gundlach | 430/39 |
| 4,403,848 | 9/1983 | Snelling | 355/4 |
| 4,545,669 | 10/1985 | Hays et al. | 355/3 R |
| 4,593,994 | 6/1986 | Tamura et al. | 355/3 SC |
| 4,870,268 | 9/1989 | Vincent et al. | 250/226 |
| 4,963,900 | 10/1990 | Budd et al. | 346/160 |
| 5,065,183 | 11/1991 | Morofuji et al. | 355/202 |
| 5,255,063 | 10/1993 | Ideyama et al. | 355/327 |
| 5,367,327 | 11/1994 | Harris | 346/157 |
| 5,483,272 | 1/1996 | Mukataka et al. | 347/129 |
| 5,537,199 | 7/1996 | Takai et al. | 355/326 R |

*Primary Examiner*—Shawn Riley
*Assistant Examiner*—Rajnikant B. Patel
*Attorney, Agent, or Firm*—Testa, Hurwitz & Thibeault, LLP

[57] ABSTRACT

An improved method of electrophotographic color printing in which only a single pass of a drum or belt is needed for formation and transfer of the toner image onto a desired medium by utilizing a transparent drum or belt for the supportive member for the photoconductive material, and exposing from the inner side of the drum or belt. The invention includes, among others, a method of synchronous laser-beam exposure that provides improved registration of images, methods of exposure for small diameter drums, a method to achieve a longer-lived drum or belt, an improved fusing method, methods of improving the toning process, and methods to achieve an improved image quality.

20 Claims, 10 Drawing Sheets

SINGLE PASS ELECTROPHOTOGRAPHIC COLOR PRINTING

BACKGROUND—FIELD OF INVENTION

This invention relates to electrophotographic color printing and digital copying methods and processes, including but not limited to laser printers.

BACKGROUND—DISCUSSION OF PRIOR ART

Present methods of multicolor electrophotographic printing employ one of two main methods: either (1) multiple drums or belts are used, one for each color, and the color toner from each is sequentially transferred onto the desired medium, or (2) a first drum or belt is used and different color toners are sequentially deposited onto it and then transferred onto the desired medium (or onto an intermediate drum or belt) so that, for example, if four colors are to be transferred, four passes of the first drum or belt are required to transfer the four color toners onto the desired medium. (A drum or belt is subsequently referred to collectively as an elongated-closed-loop-shaped member.) In both cases, this greatly reduces the speed of the printing process, makes the precise registration of the colors more difficult, and requires many extra components including many duplicated components.

In both of the above two methods, the exposure and the deposition of toner are done from the same (outer) side of the drum or belt so that deposition of one color toner blocks the subsequent exposure of the same region on the drum or belt for deposition of another color toner. This restriction is removed if a drum or belt with an inner supportive transparent element is used so that exposure is done from the interior or inner side of the drum or belt and toner deposition is done onto the exterior or outer side of the drum or belt, which allows multicolor printing to be achieved with a single pass of the drum. Methods to achieve single pass electrophotographic color printing utilizing exposure from the interior of a drum or belt that comprises an inner supportive transparent element have been described in various U.S. patents including, fairly recently, U.S. Pat. No. 5,065,183 to Morofuji et al. (11/1991). However, no single pass electrophotographic color printer with several colors using these methods has yet been introduced in the marketplace.

One major drawback of such previously proposed methods is that they have used a separate scanner (rotating polygon mirror) for each laser beam to achieve exposure, which makes registration of the colors more difficult and complicates and increases the cost of manufacturing the printer. Additionally, there are potential problems that have not been adequately addressed in the use of a single pass multicolor electrophotographic printing process that are not present or are much less severe in present multiple pass multicolor electrophotographic printing processes such as the smearing of previously deposited toners by subsequently deposited toners, and the adequate erasure of charge and thus the adequate removal of excess toner after each deposition. Furthermore, many significant improvements that are made possible by utilizing a drum or belt with an inner supportive transparent member have not been previously recognized. Overcoming or mitigation of these drawbacks and problems and/or addition of these improvements could significantly enhance the viability of a single pass electrophotographic color printer in the marketplace.

OBJECTS AND ADVANTAGES OF THE INVENTION

Accordingly, an object of the invention is to provide a new and improved printing method and process wherein the aforementioned problems of multicolor electrophotographic printing using a drum or belt with an inner supportive transparent member are overcome or mitigated.

A further object of the invention is to provide significant improvements in methods of exposure of the drum or belt.

Another object of the invention is to provide significant improvements in the drum or belt which enhance its utilization in multicolor electrophotographic printers.

Still another object of the invention is to provide significant improvements in the methods of deposition, removal, fusing, and utilization of color toners in multicolor electrophotographic printers employing the drum or belt.

Yet another object of the invention is to provide significant improvements in the quality of the multicolor image formed in multicolor electrophotographic printers employing the drum or belt.

Further objects and advantages will become apparent from a consideration of the ensuing descriptions and drawings.

SUMMARY OF THE INVENTION

The foregoing and other objects of the invention are achieved through the utilization of a drum or belt with an inner transparent supportive member in an electrophotographic color printer such as, but not limited to, a laser printer in which the exposure of the drum or belt is done from the interior or inner surface of the drum or belt and the toner is deposited on the exterior or outer surface of the drum or belt so as to achieve multicolor printing with a single pass of the drum or belt.

In accordance with one aspect of the present invention, exposure of the drum or belt is done with a optical system in which multiple lasers, one for each color, are located interior to the drum or belt, and scanning is accomplished with a single scanner (rotating polygon mirror), thereby providing improved synchronization of the beams and thus improved registration of colors in the final color image, together with reduction of the number of parts and the manufacturing cost.

In accordance with another aspect of the present invention, the aforementioned exposure of the drum or belt is done with an optical system in which the lasers are located exterior to the drum or belt and the laser beams are brought into the interior portion of the drum or belt.

In accordance with yet another aspect of the present invention, the aforementioned exposure of the drum or belt is done with an optical system in which the laser is located internal to a drum with a diameter typically less than its length and the laser beam is multiply reflected so as to increase the extent of the scan of the laser beam on the drum for a given angle of deflection without degrading the image quality.

In accordance with still another aspect of the present invention, the residual photoconductor image is discharged (erased) by lights located on the interior side of the transparent drum, thus permitting the outermost surface of the drum or belt to be opaque.

In accordance with a further aspect of the present invention, the outermost layer of the transparent drum or belt is comprised of a material which is highly resistant to abrasion and therefore will provide a longer life for the drum and will provide higher quality of printed images during its life; such layer can be opaque which allows a broader choice of abrasion-resistive materials.

In accordance with yet a further aspect of the present invention, the outermost layer of the drum or belt is opaque and composed of a lightly-colored or white or reflective material thereby allowing radiant heat to be used to melt the toners on the drum without overly heating the drum or belt and thereby simplifying the transfer of the toners to the desired medium, and also thereby facilitating the use of in-printer densitometers, and also thereby enhancing the use of a test pattern(s) on the surface of the drum used to enhance the image quality through the use of densitometers that respond to the test pattern(s).

In accordance with an additional aspect of the present invention, toner is deposited onto the outer surface of the drum or belt through the use of a monocomponent toning device which transfers the toner from the toning station across a small gap, thereby minimizing smearing of previously deposited toners on the drum or belt.

In accordance with still additional aspects of the present invention, removal of excess toner is enhanced by using a toner which is slightly conductive, by using charge neutralization devices in addition to light erasure devices, and by using a cleaning station on the inside of the drum.

In accordance with yet an additional aspect of the present invention, exposure sources located internal to the drum or belt are used instead of lasers such as arrays of light emitting devices or injection lasers, an illuminating source plus a liquid crystal shutter array, or a linear cathode ray tube.

In accordance with other aspects of the present invention, the quality of the image is enhanced through the use of a test pattern on a white outer portion of the drum or belt, and coding of toner batches.

DRAWING FIGURES

The method and process of the present invention will now be described, using an electrophotographic printer as the preferred embodiment of the invention, wherein.

DESCRIPTION—FIGS. 1 THROUGH 3

Figure 1:
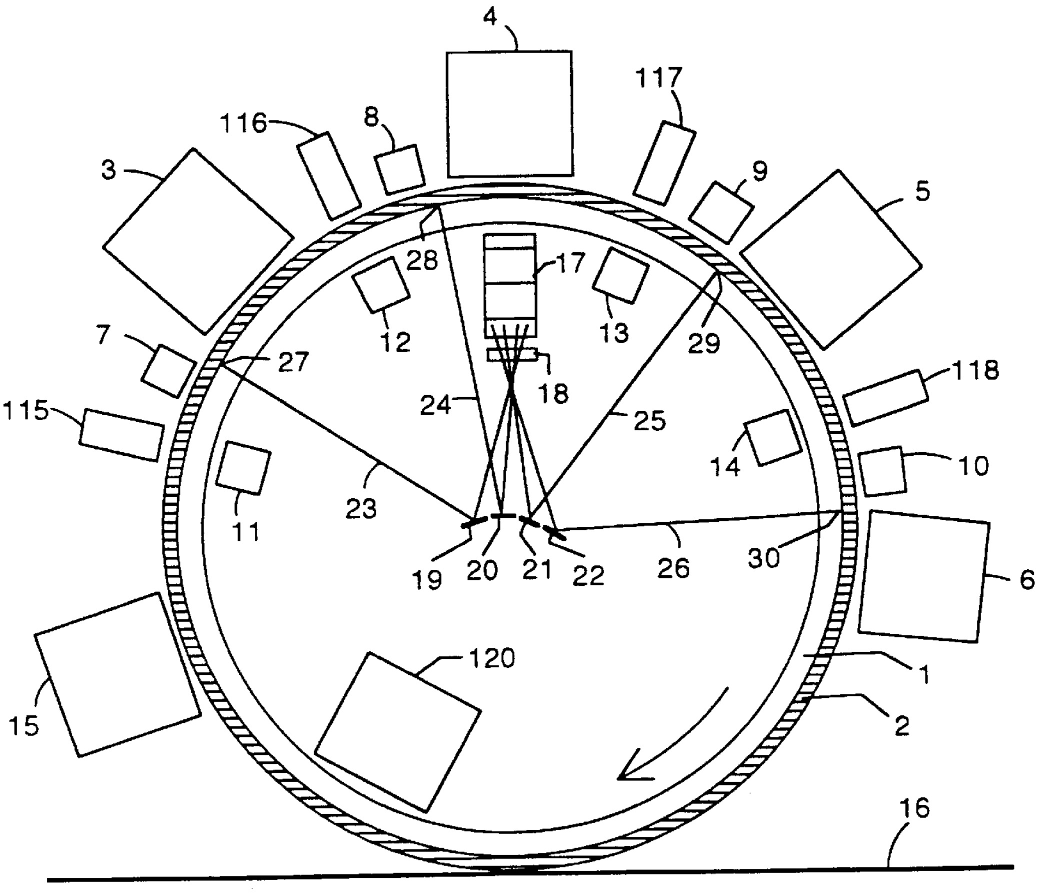
FIG. 1 is a diagrammatic cross-sectional type of view of a laser electrophotographic printer with a drum in accordance with the present invention.

In reference to FIG. 1, there is a cylindrical drum which consists of an inner supportive transparent member 1 of plastic, glass, or another transparent material, on which there are layers 2. The thickness of the drum and the layers 2 are enlarged in the drawing relative to the other elements for clarity. Circumferentially spaced around the exterior of the drum are multiple toning stations 3, 4, 5 and 6, together with multiple charging stations 7, 8, 9, and 10, multiple charge erasure lights 11, 12, 13, and 14, and a cleaning station 15. A medium 16 such as paper onto which the toner is transferred is positioned below the drum and is in tangential contact with it. In the interior of the drum is located an optical exposure system used to form the latent electrostatic image on the drum incorporating a single scanner 17 together with an f-theta lens 18 and four mirrors 19, 20, 21, and 22. For clarity, facets of the scanner 17 are shown in the drawing that would not be in a true cross-sectional view, and the width of the f-theta lens is enlarged. Also shown are the four laser beam 23, 24, 25, and 26 that are reflected from one of the facets of the scanner 17 to the four mirrors 19, 20, 21, and 22 and then onto the interior of the layers 2 at impingement points 27, 28, 29, and 30 located intermediate to the respective charging stations and toning stations. The laser beams would typically not be in the plane of the drawing except for a single position of the scanner. The laser beams are modulatable either by modulation of their source or by a separate modulator. Not shown are four lasers located at an angle to and above the figure with their beams impinging on the facet of the scanner in the diagram to be continuous with the four laser beams emerging from the scanner. Also not shown are the laser modulators and optics in the case of externally modulated lasers such as gas lasers. Additionally not shown is a heating station to fuse the toners onto the paper. Except for the scanner and the f-theta lens, all the elements shown extend a substantial distance perpendicularly above and below the plane of the diagram. The scanner 17 is shown as being comprised of a rotating polygon mirror, but could be comprised of a rotating hologram which would have the possible advantages of allowing the beam to be swept over wider angles and could incorporate the effect of the f-theta lens. Members 115, 116, 117, 118 are charge removal devices and member 120 is an additional cleaning station; these are enhancements to the basic operation of the system and are described later.

Concerning the optical exposure system, the four laser beams 23, 24, 25, and 26 and the four mirrors 19, 20, 21, and 22 are shown separated by a significant distance in FIG. 1 to provide clarity, but in actual practice the lasers, laser beams, and the mirrors should be placed as close together as is practicable to avoid distortion of one beam in comparison to the others, and the beams would thus cross closer to or within the f-theta lens. The mirrors should be positioned to have the path lengths of the four laser beams substantially equal from reflection from the facet of the scanner to the points of impingement 27, 28, 29, and 30 on the inner portion of layer 2. The four mirrors may be comprised as a single long unit to achieve compactness and mechanical stability.

For configurations where the diameter of the drum is large compared to its length, an alternate system is possible in which the scanner is placed near the center of the drum, the lasers are placed at larger angles to the scanner, and no mirrors are used.

Figure 2:
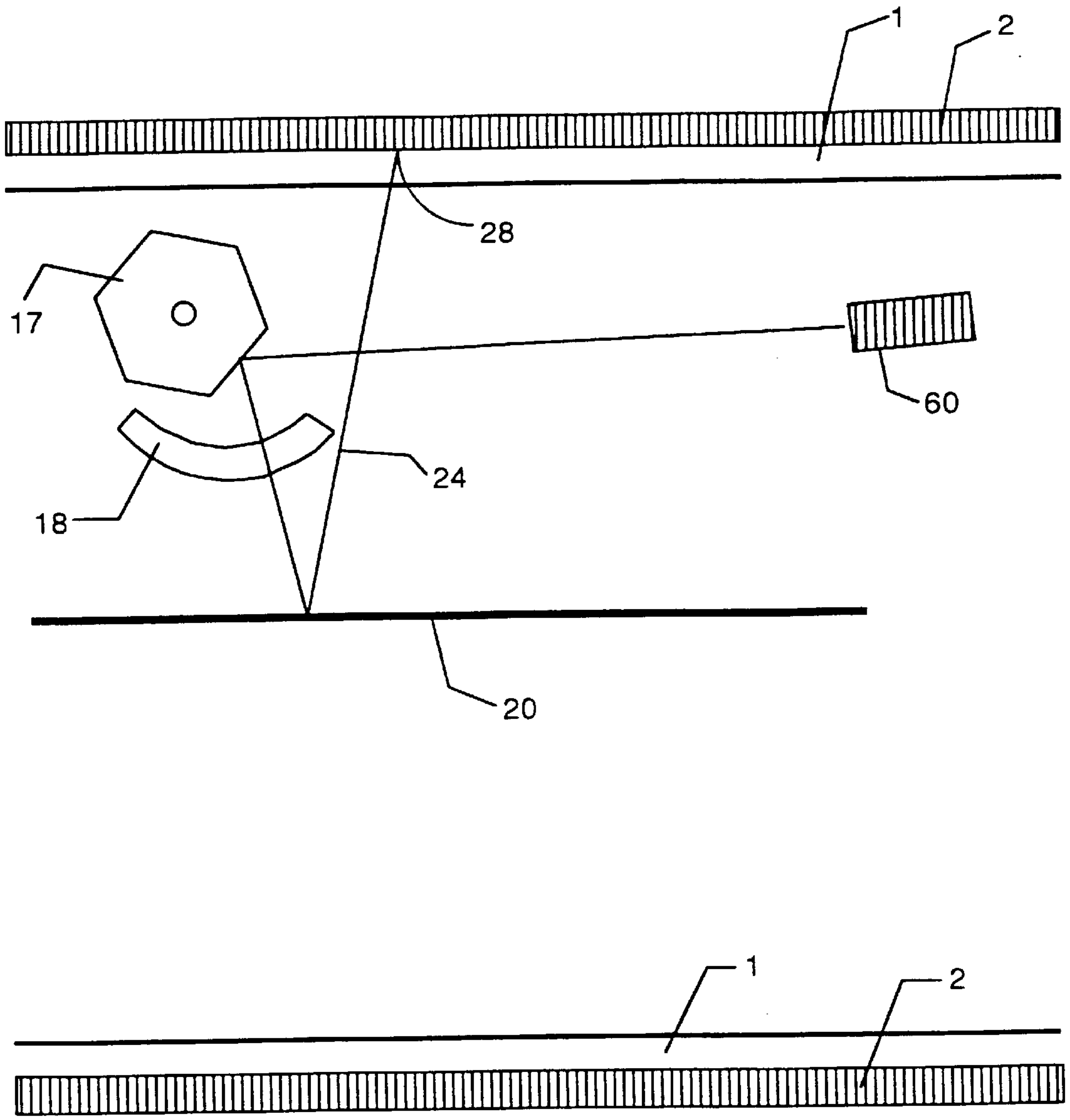
FIG. 2 is a diagrammatic cross-sectional type of side view of a portion of FIG. 1 showing the relationship of one laser and its beam to the scanner, the f-theta lens, one mirror, and the drum.

FIG. 2 is a side view of FIG. 1 showing the location of one laser 60. FIG. 2 is shortened longitudinally; for example, the drum (1 and 2) and the mirror 20 extend further to the left than shown. For purposes of illustration, laser beam 24 is selected from FIG. 1 to show its relation to the laser 60, the scanner 17, the f-theta lens 18, the mirror 20, and its point of impingement 28 on the innermost surface of the outer layer 2 of the drum. Typically, the laser 60, its laser beam 24, and the mirror 20 would not be in the plane of the drawing, and furthermore the laser 60 can be place at a different position within the drum than shown, including at the lower portion of the figure below the mirror 20; in such a case, the mirror 20 and the f-theta lens 18 would not block the laser beam since the laser beam would not be in the same plane as the mirror 20 and the f-theta lens 18, and would be tilted with respect to these elements. The other three lasers would be placed essentially side by side with the laser 60, above and below the plane of the diagram. Not shown are optics to focus the four beams onto the scanner facet. The four lasers can be injection lasers, which have the advantages that they can be directly modulated, and are compact; they can be comprised as a single unit if desired. It is readily seen that the four lasers can be moved to the right on the diagram so as to be external to the right longitudinal boundary of the drum without affecting their operation.

Figure 3:
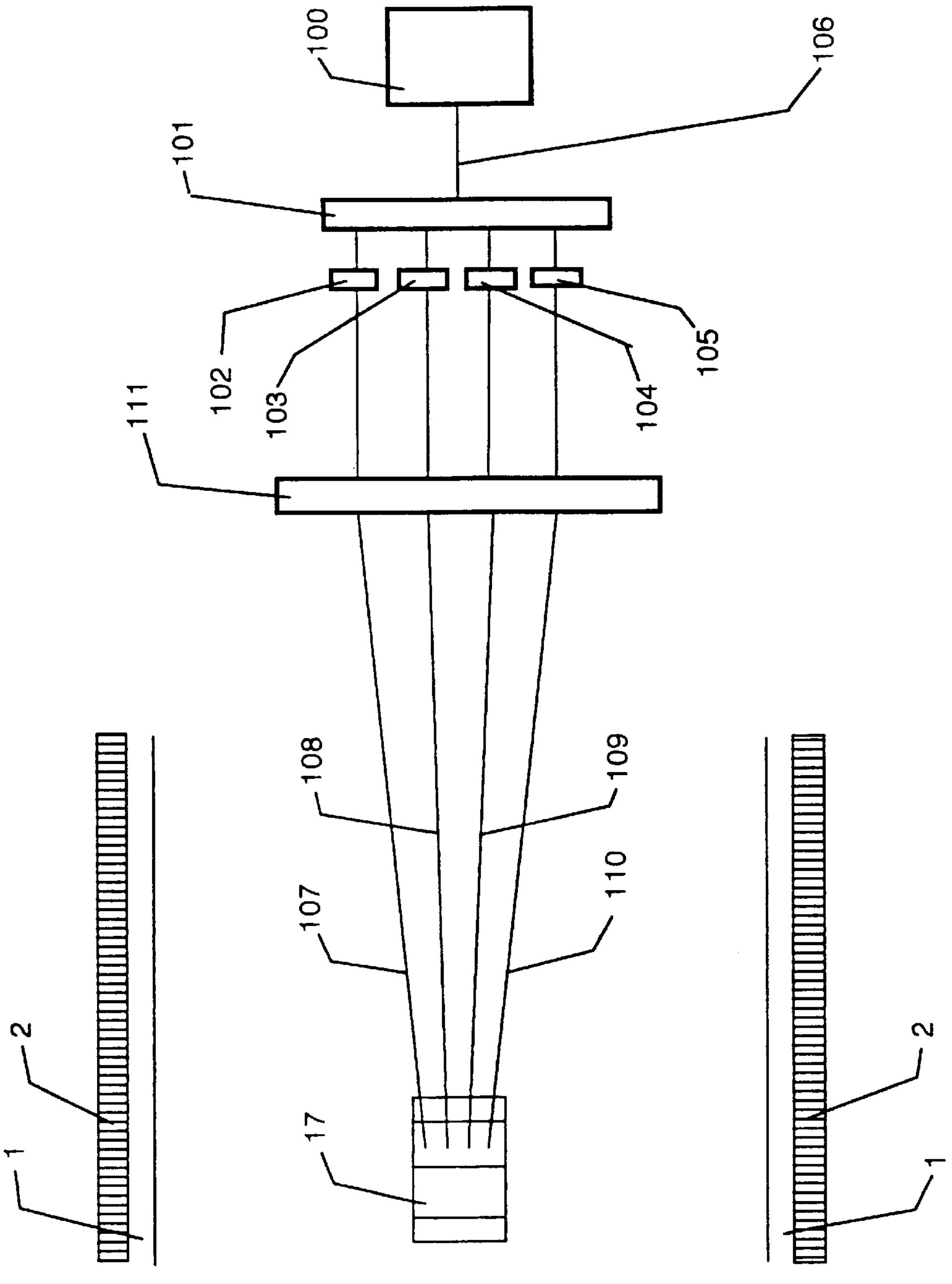
FIG. 3 is a diagrammatic cross-sectional type of bottom view of a portion of FIG. 1 showing an alternate laser source and the relation of the incoming four laser beams to the scanner.

For lasers which require a separate modulator such as a gas laser, because of the size of the gas laser and modulator when small diameter drums are used, it would be advantageous to place the gas lasers and modulators external to a longitudinal boundary of the drum. FIG. 3 shows a bottom view of a gas laser 100 together with a beam splitter 101 by which the original beam 106 is split into four beams 107, 108, 109, and 110, and four modulatable light shutters 102, 103, 104, and 105 which separately modulate the four beams. The four beams need not be exactly parallel as shown. The shutters can be comprised of liquid crystals. Also shown is an optical system 111 to focus the beams onto a facet of the scanner 17. Instead of or in addition to the optical system 111, an optical system can be placed between the gas laser 100 and the beam splitter 101. FIG. 3 is shortened longitudinally; for example, the drum extends further to the left and right than shown. FIG. 3 thereby shows the relation of the four laser beams to the scanner, irrespective of whether four separate lasers are used, or whether one laser is used with the beam split into four beams, thus giving further insight into the relation of the laser beams with the scanner in FIGS. 1 and 2. In FIG. 3 the laser beams are separated to provide clarity, but in actuality would be closer together than indicated, crossing closer to or within the f-theta lens.

When the injection lasers or the gas lasers and modulators are placed external to a longitudinal boundary of the drum but close to the rotation axis of the drum, their beams can be aimed directly onto the scanner. If the injection lasers or the gas lasers and modulators are placed externally to the drum but at a non-axial orientation or far from the axis, then their laser beams would be directed onto the scanner through the use of an optical system employing mirrors and lenses.

The term multicolor can refer to a wide combination of colors including, for example, cyan, yellow, magenta, and black. The term multicolor can also refer to a combination including a clear or transparent "color."

OPERATION—FIGS. 1 THROUGH 3

The general operation of the color laser printer is the same as the operation of black-and-white laser printers except for the use of multiple toning stations, charging stations, and charge erasure lights, and the exposure of the drum from its interior. The drum is rotated at a constant rate in the direction indicated by the arrow. At least one end of the drum can be supported and driven by circumferential means. For example, in the sequential operation of the first grouping of the four electrophotographic elements including the charge erasure light 11, charging device 7, laser beam 27, and toner station 3, the residual charge on the drum is first erased, then the drum is charged, then the drum is exposed by the laser beam, and finally toner is deposited on the drum at the selected locations. The charge erasure lights 11, 12, 13, and 14 should be placed in the interior of the drum as shown since a previously deposited toner would block and thus prevent, at least in part, the charge erasure light from discharging the photoconductive layer for subsequently deposited toners (except for the first charge erasure light 11). The four beams are swept along the length of the drum by the scanner 17, essentially perpendicularly to the direction of motion of the drum. Since a single scanner 17 is used for all the laser beams, the transverse motions of all the beams are automatically synchronized with each other. Since the path lengths of the four laser beams are substantially equal, transverse registration of all of the beams is assured in forming an image. To achieve longitudinal registration of the beams, time delays in data transmission to each laser, or its modulator if externally modulated, are provided so that the second 24, third 25, and fourth 26 laser beam signals are respectively delayed for longer times before being activated and modulated with respect to the first laser beam 23. These time delays can be conveniently manually set for each printer by preparing a test pattern and having it printed by the printer to show how the colors are registered, and then resetting the time delays to optimize the registration of the colors. The time delays can be optimized and set during its manufacture and subsequent service (if necessary) to account for minor variations in the optical system from machine to machine such as spacing variations. The image for each color is formed by the operation of each of the four above groupings in a sequential manner as the drum turns so that the toner deposited for later colors can overlap toners previously deposited. The multicolor image comprising the colored toners is then transferred from the drum to the desired medium 16 such as paper (or transferred onto a second drum or belt and then onto the desired medium). The residual toner is then removed by the cleaning station 15. Thus, the multicolor image is formed and transferred to the desired medium in one pass of the drum. When drums are used with a circumference smaller than the length of the desired medium, more than one rotation of the drum may be required to accomplish this formation and transfer of the multicolor image to the desired medium; the term "pass" means the complete formation and transfer of an image in which a single point on the drum provides a single point on the image only once, albeit requiring multiple rotations of the drum to complete, for example, a long page.

DESCRIPTION AND OPERATION—FIGS. 4 THROUGH 8

Figure 4:
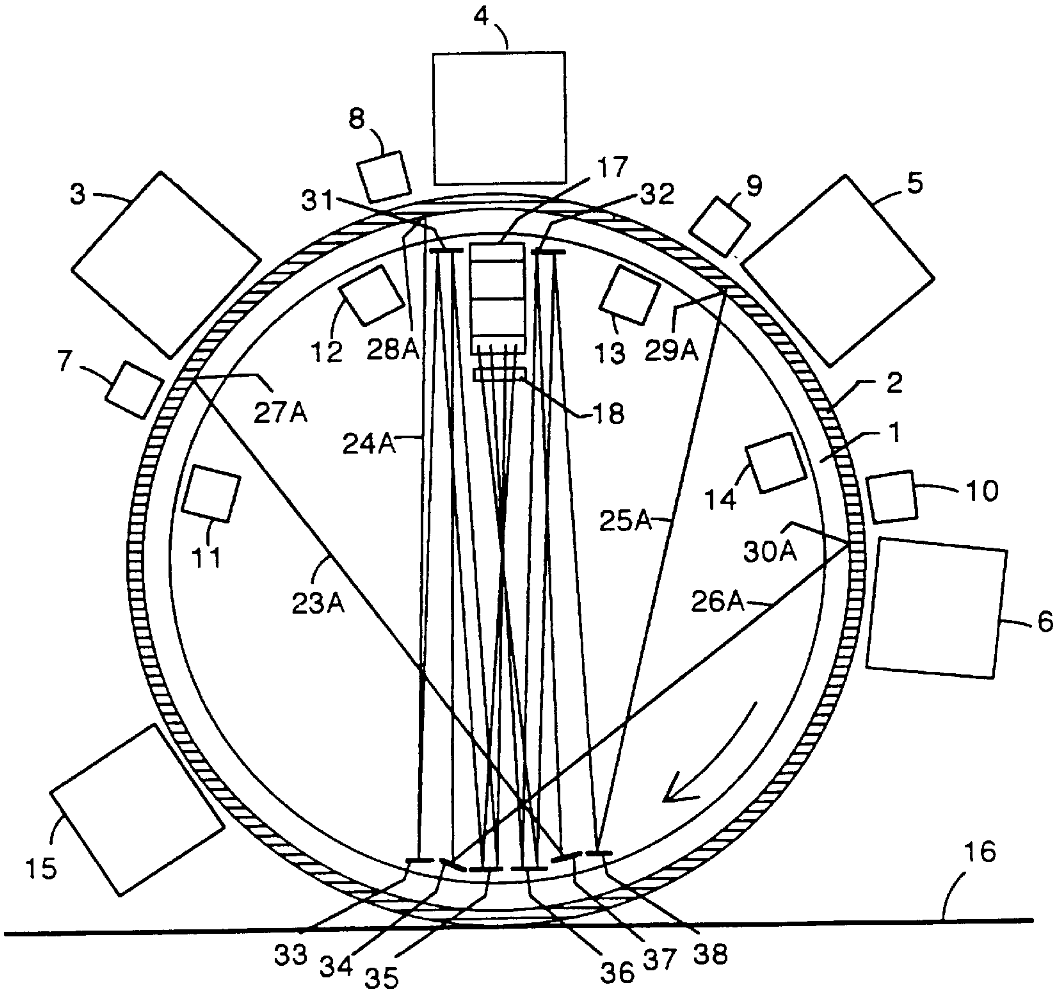
FIG. 4 is a diagrammatic cross-sectional type of view of a laser electrophotographic printer showing an alternate optical system for exposure of the drum.

In the method as indicated in FIG. 1, if the length of the drum is long in comparison to its diameter, the laser beams are then swept by the scanner through large angles, which may result in degradation of the image. FIG. 4 shows a method to correct this problem and provide a larger motion of the beams for a given angle of scan. In reference to FIG. 4, the optical paths of the laser beams 23A, 24A, 25A, and 26A are folded through the use of a mirror configuration incorporating mirrors 31, 32, 33, 34, 35, 36, 37 and 38, and the use of a different geometry than shown in FIG. 1. For example, the leftmost beam impinging on a facet of the scanner is reflected from the scanner so as to be directed to mirror 36, then to mirror 32, then to mirror 38, and finally impinging on the inner portion of the layer(s) 2 at point 29A (for beam 25A). The mirrors are positioned so as to make the path lengths of the four laser beams substantially equal from reflection from the facet of the scanner to the points of impingement 27A, 28A, 29A, and 30A on the inner portion of the layers 2, and as in FIG. 1, the laser beams would actually be placed closer to each other than shown, thus crossing closer to or within the f-theta lens.

Figure 5:
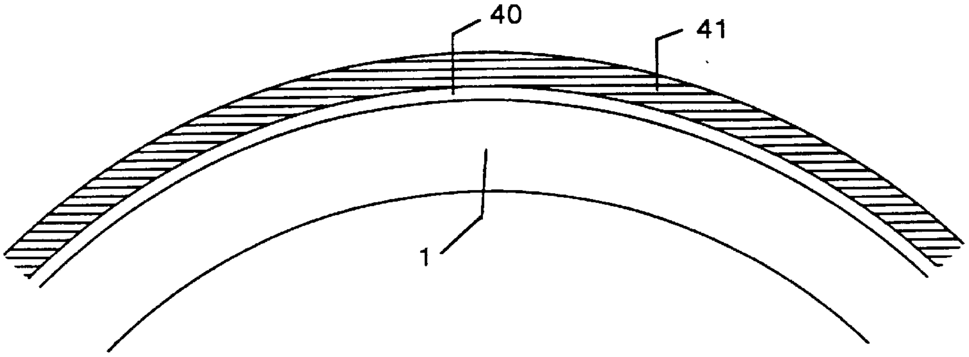
FIG. 5 is a diagrammatic cross-sectional view of a portion of one configuration of the drum.

As shown in FIG. 5, as a minimum, the drum may consist of a relatively thick inner supportive transparent member 1 upon which there are two layers: a very thin transparent or semi-transparent electrically conducting or partly conducting layer 40 such as tin oxide which is electrically connected to one terminal of the charging station (e.g. ground), and upon which is a relatively thin photoconductive layer 41 in which the laser light is absorbed resulting in the formation of electron-hole pairs.

Figure 6:
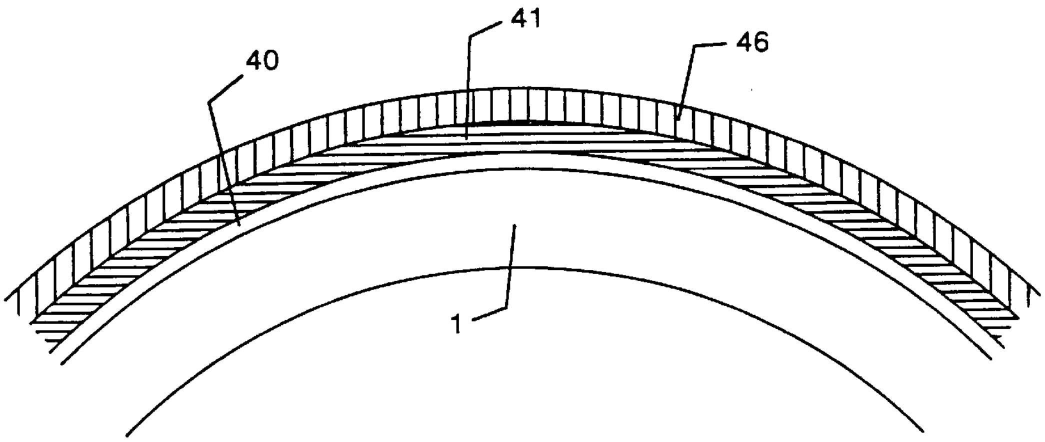
FIG. 6 is a diagrammatic cross-sectional view of a portion of another configuration of the drum

FIG. 6 shows another embodiment of the drum incorporating a relatively thick inner supportive transparent member 1 upon which are three layers: a very thin transparent or semi-transparent electrically conducting or partly conducting layer 40, a photoconductive layer 41, and an outer layer 46. The layers 1, 41, and 46 can be composed of inorganic or organic materials. The outer layer 46 can operate as a charge transport layer, or can be insulating and operate by means of formation of an image charge. It can be comprised of a material which is highly abrasion resistant and/or opaque and/or white and/or reflective. It can also be comprised of two layers, the first operating as a charge transport layer, and the second as an insulating layer, preferably a thin insulating layer. In addition to the layers indicated, there can be further layers used to improve the adherence of one layer to another.

Figure 7:
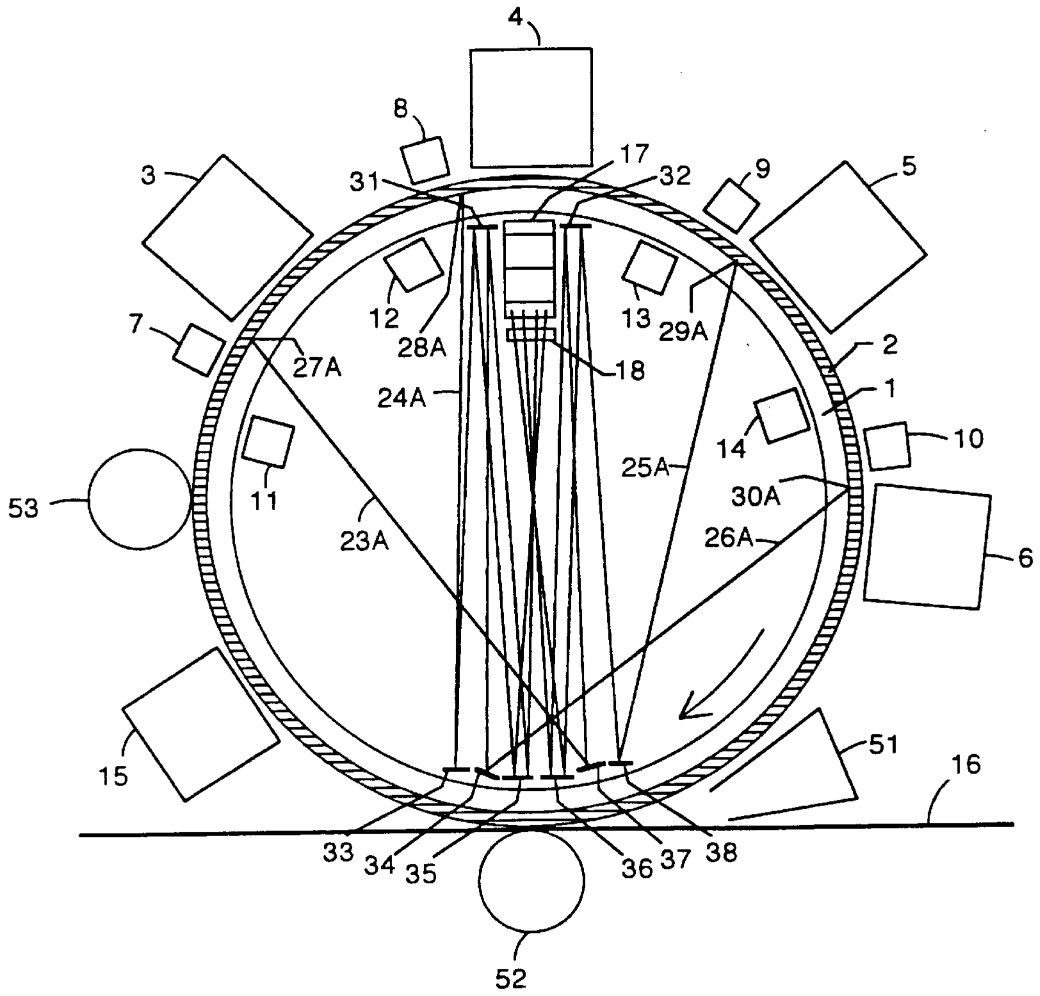
FIG. 7 is a diagrammatic cross-sectional type of view of a laser electrophotographic printer together with additional elements to achieve an alternate method of achieving toner transfer.

FIG. 7 shows the additional members 51, 52, and 53 used to achieve an alternate toner transfer method when the outer layer 46 of FIG. 4 is comprised of a material which is reflective to infrared and visible light. Member 51 consists of a radiant heater which focuses the radiant heat onto the drum directly prior to where the outer surface of the drum and the desired medium 16 meet. The radiant heat softens or melts the toner. Member 52 is a heated roller which is placed against the desired medium 16 and the drum with pressure which facilitates the simultaneous fusing and transfer. Because of the reflective nature of the outer layer 46, the layers 2 and the inner member 1 do not heat excessively. Member 53 is a cooled roller applied to the drum to remove heat from the drum; alternately, a cooled belt (together with rollers to press the belt against the drum) can be used to increase the area of contact with the drum. Air jets or similar means may be used to cool the drum. Members 51, 52, and 53 extend perpendicularly above and below the plane of the diagram.

In FIGS. 4 and 7, further folding of the laser beam can be done by using additional mirrors. In such an optical system the number of mirrors can be reduced by having each of the laser beams reflected more than once by the same mirror.

In FIGS. 1, 4, and 7, the toning stations, charging stations, and charge erasure lights are shown to be about equally spaced around the circumference of the drum. For reasons of manufacturing convenience, for example, these stations can be spaced unequally around the circumference of the drum. In such a case, the angles and positions of the mirrors would have to be suitably changed to ensure that the laser beams impinge on the drum at the correct locations.

The desired medium 16 in FIGS. 1, 4, and 7 is shown to be flat. When using paper as the desired medium it may be desirable to have the paper held onto a curved surface such as a second drum for purposes of convenience. Additionally, it may be desirable to first transfer the image from the drum onto a second drum or a belt and then onto a final medium such as when the final medium is not a flat surface such as a can or bottle or is otherwise irregular.

Figure 8:
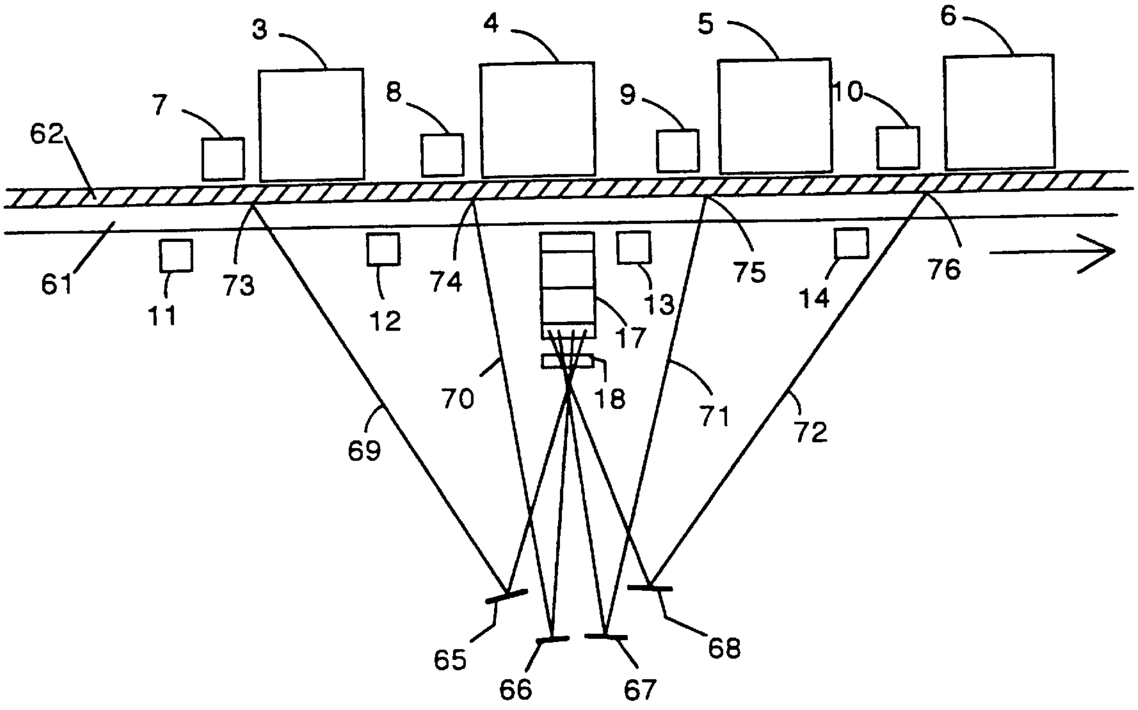
FIG. 8 is a diagrammatic cross-sectional type of view of a laser electrophotographic printer with a belt in accordance with the present invention.

FIG. 8 shows a multicolor single pass laser printer using a belt instead of a drum, but otherwise is generally analogous to the laser printer shown in FIG. 1 so is only briefly described here. The belt consists of an inner supportive transparent member 61 on which there are layers 62. Included are the same multiple toning stations 3, 4, 5, and 6, charging stations 7, 8, 9, and 10, charge erasure lights 11, 12, 13, and 14, scanner 17, and f-theta lens 18 as indicated in FIG. 1. The cleaning station and the desired medium are located at another position along the belt and are not shown. The mirrors 65, 66, 67, and 68 are positioned so that the path length for the four laser beams 69, 70, 71, and 72 are substantially equal from the scanner 17 to the points of impingement 73, 74, 75, 76. The laser beams are separated for clarity, but in actuality are closer to each other than shown, and also thus cross closer to or within the f-theta lens 18. To achieve a larger motion of the laser beams for a given angle of scan, their optical paths can be folded by using additional mirrors in a manner analogous to FIG. 4. The layers 62 on the belt can be the same as shown in FIGS. 5 and 6, but would typically be flat in the regions where the image is formed. Generally, the features and improvements described previously for a laser printer with a drum would apply to a laser printer with a belt.

DESCRIPTION AND OPERATION—FIGS. 9 AND 10

Figure 9:
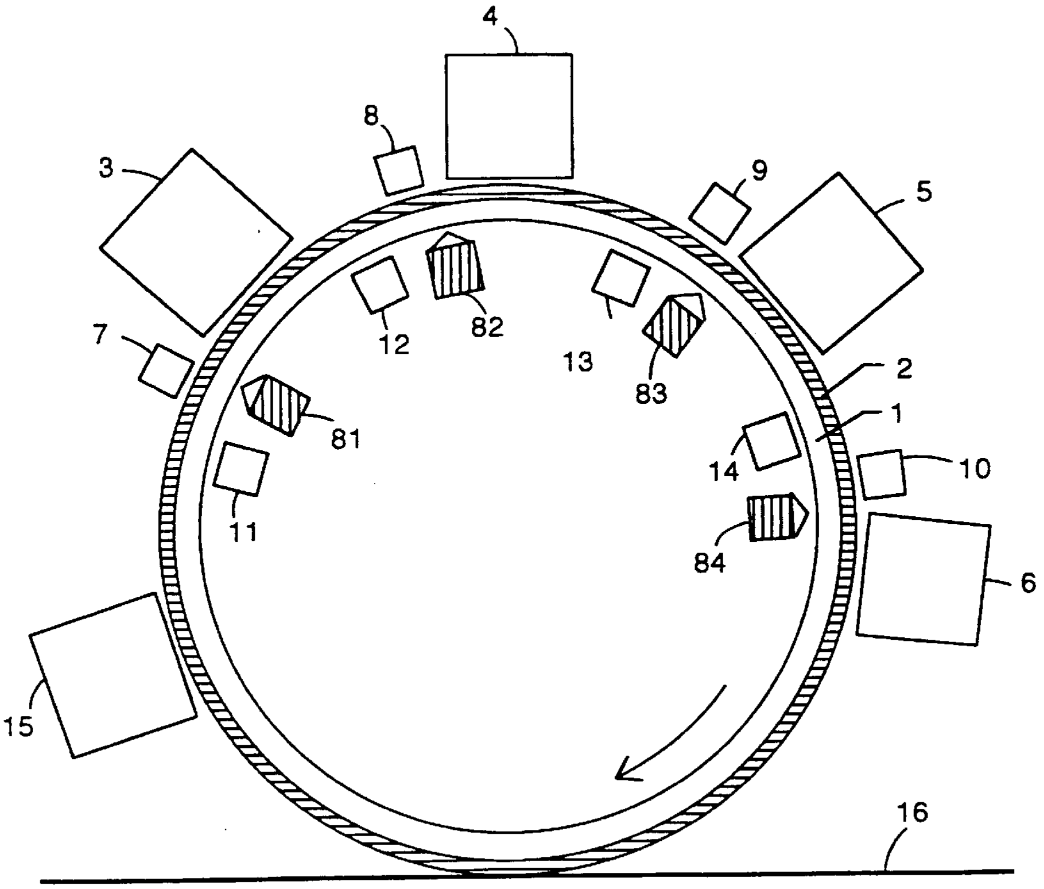
FIG. 9 is a diagrammatic cross-sectional view of an electrophotographic printer in which a modulatable light source is used for exposure of the drum.
Figure 10:
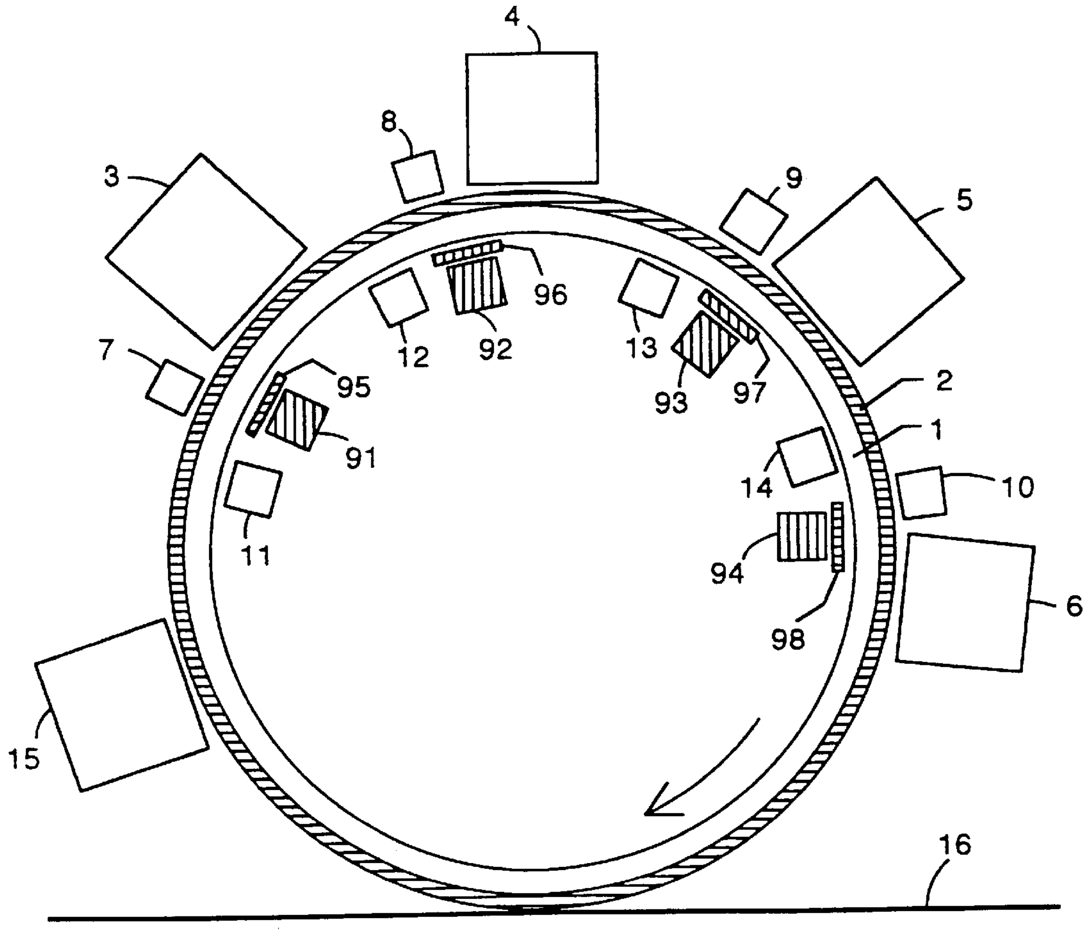
FIG. 10 is a diagrammatic cross-sectional view of an electrophotographic printer in which a light source with a modulatable shutter is used for exposure of the drum.

An electrophotographic printer can use other methods to expose the drum from its interior instead of using laser beams and scanners. FIG. 9 shows a single pass electrophotographic color printer comprising four arrays of light emitting diodes, or four arrays of injection lasers, or four linearly-configured cathode ray tubes, shown as 81, 82, 83, and 84. All of these sources can be modulated directly. FIG. 10 shows a single pass electrophotographic color printer employing four light sources 91, 92, 93, and 94 together with four light shutters such as liquid crystal light shutters 95, 96, 97, and 98. In this case, the modulation of the light sources is done with the light shutters. Not shown in FIGS. 9 and 10 are light shields and slits to create a narrow exposure onto the drum and to avoid light leakage and scatter as appropriate. The operation of these two printers is essentially the same as described for FIG. 1 except for the substitution of the alternate light sources (and the modulator for the case of FIG. 10), and the need to provide transverse synchronization of the modulation signals to the four light sources (or shutters) in addition to the longitudinal synchronization. Many of the features and improvements described previously for a laser electrophotographic printer would apply to these electrophotographic printers.

DESCRIPTION—ADDITIONAL FEATURES

To achieve the best toning process, there are several improvements that may be made based on recognizing differences in the toning process between present electrophotographic color printers and that of a single pass electrophotographic color printer. First, deposition of subsequent toners onto the drum or belt may cause smearing of the previously deposited toners. This may occur when liquid toners are used, and may also occur when a two-component toner is used since the carrier may dislodge previously deposited toner particles. Thus, it may be advantageous to use a monocomponent toning method in which the toner particles are electrostatically transferred across a small gap, typically about 100 micrometers, onto the drum or belt. Second, the discharge of the drum or belt may be deleteriously affected by the presence of toner that has been deposited on the drum or belt. One may compensate for this by employing toners that are very slightly electrically conductive. Also, one may compensate for this by using additional charge removal devices such as alternating current coronas which effectively neutralize the charges on the outer surface of the drum or belt. As shown in FIG. 1, these charge removal devices 115, 116, 117, and 118 can be placed at the exterior of the drum or belt in juxtaposition to the charge erasure lights in the interior of the drum or belt. Third, stray toner particles or other particles may deposit on the inner surface of the drum or belt. Since the drum or belt must be transparent in this printing method, as shown in FIG. 1, it would be advantageous to provide a cleaning station 120 for the inner surface. Fourth, it may be advantageous to place the toning stations at the bottom of the drum or belt (and the desired medium at the top of the drum or belt) to utilize gravity to minimize the transfer of unwanted toner particles onto the drum or belt.

To achieve the highest quality color image, there are several improvements that may be made. First, the order of the color of the toners in the toning stations should be chosen so that the darker color toners do not obscure the lighter color toners. Second, since toner batches vary, one may substantially compensate for this by changing the modulation of the lasers (or other exposure sources) to provide more or less exposure and thereby more or less toner deposition for each toner. Third, each toner container may be marked with machine- or human-readable code that would allow adjustment of the modulation of the lasers (or other exposure sources) and adjustment of the xerographic voltages to achieve this compensation. Fourth, previously deposited toners may affect subsequent toner deposition, and one may substantially compensate for this by suitably changing the modulation of the lasers (or other exposure sources) and adjustment of the xerographic voltages. Fifth, the electrophotographic printing process varies due to factors in addition to toner batch variations such as humidity, temperature, toner depletion, and manufacturing variations. All of these variations may be substantially determined by using at least one densitometer located in proximity to the drum or belt and directed at the image, and substantially compensated by suitably changing the modulation and/or the brightness of the lasers (or other exposure sources) and the xerographic voltages. Sixth, the previous variations may also be determined by electronically generating and forming a test pattern on the drum or belt but beyond the edge of the active image area so that the test pattern does not appear on the desired medium. The test pattern is read by at least one densitometer located in proximity to the drum or belt, and differences between what is read from the test pattern compared to the desired results (such as from an ideal test pattern) are then used to provide substantial compensation in the image by suitably changing the modulation and/or brightness of the lasers (or other light sources) and the xerographic voltages. The test pattern is removed by the clearing station at the end of each pass or turn of the drum or belt. Seventh, the above uses of a densitometer(s) may be enhanced by using a white outer layer for the entire drum or belt so that the image and the test pattern are on a white background, or by forming a white portion of the drum or belt (beyond the edge of the active image area) on which the test pattern is placed.

Obviously, appropriate combinations of the features and improvements described above are possible, and are intended to be included within the scope of the present invention. Also, obviously, modifications and variations of the present invention are possible in light of the teachings of this invention, and such modifications and variations are intended to be included within the scope of the present invention.

I claim:

1. An electrophotographic printing apparatus for forming a multicolor image on a medium comprising:

an elongated-closed-loop-shaped member comprising a transparent substrate and a photoconductive layer;

a plurality of charging stations disposed adjacent to the elongated-closed-loop-shaped member and depositing charge thereon;

a plurality of toning stations disposed adjacent to the elongated-closed-loop-shaped member, each of the toning stations disposed proximate to one of the charging stations and depositing a toner onto the elongated-closed-loop-shaped member;

a source of a plurality of modulatable laser beams;

a shared scanner optically coupled to the source and disposed in the interior of the elongated-closed-loop-shaped member, the shared scanner reflecting each of the laser beams received from the source; and a plurality of mirrors optically coupled to the shared scanner, each of the mirrors reflecting at least one of the laser beams onto the photoconductive layer for selectively removing charge from the elongated-closed-loop-shaped member, the toner from each of the toning stations adhering to the elongated-closed-loop-shaped member based upon remaining charge for forming a multicolor image.

2. The electrophotographic printing apparatus of claim 1 wherein the source is disposed in the interior of the elongated-closed-loop-shaped member.

3. The electrophotographic printing apparatus of claim 1 further comprising a radiant heater for heating the multicolor image prior to transferring the image from the elongated-closed-loop-shaped member to a print medium.

4. The electrophotographic printing apparatus of claim 1 further comprising a charge erasure light disposed in the interior of the elongated-closed-loop-shaped member.

5. The electrophotographic printing apparatus of claim 1 further comprising a densitometer disposed adjacent to the elongated-closed-loop-shaped member for monitoring at least a portion of the multicolor image.

6. An electrophotographic printing apparatus for forming a multicolor image on a medium comprising:

an elongated-closed-loop-shaped member comprising a transparent substrate, a photoconductive layer disposed over the transparent substrate and an opaque outermost layer disposed over the photoconductive layer;

a plurality of charging stations disposed adjacent to the elongated-closed-loop-shaped member and depositing charge thereon;

a plurality of toning stations disposed adjacent to the elongated-closed-loop-shaped member, each of the toning stations disposed proximate to one of the charging stations and depositing a toner onto the elongated-closed-loop-shaped member; and a plurality of modulatable exposure sources disposed in the interior of the elongated-closed-loop-shaped member, each of the modulatable exposure sources exposing the photoconductive layer for selectively removing charge from the elongated-closed-loop-shaped member, the toner from each of the toning stations adhering to the elongated-closed-loop-shaped member based upon remaining charge for forming a multicolor image.

7. The electrophotographic printing apparatus of claim 6 wherein at least one of the plurality of modulatable exposure sources is a light emitting diode array.

8. The electrophotographic printing apparatus of claim 6 wherein at least one of the plurality of modulatable exposure sources is an injection laser array.

9. The electrophotographic printing apparatus of claim 6 wherein at least one of the plurality of modulatable exposure sources comprises a laser source optically coupled to a scanner disposed within the interior of the elongated-closed-loop-shaped member, the scanner reflecting a laser beam generated by the laser source to the photoconductive layer.

10. The electrophotographic printing apparatus of claim 6 further comprising a densitometer disposed adjacent to the elongated-closed-loop-shaped member for monitoring at least a portion of the multicolor image.

11. The electrophotographic printing apparatus of claim 6 wherein the opaque outermost layer is abrasion resistant.

12. The electrophotographic printing apparatus of claim 6 wherein the opaque outermost layer is white.

13. The electrophotographic printing apparatus of claim 6 wherein the opaque outermost layer is reflective to infrared light.

14. The electrophotographic printing apparatus of claim 6 further comprising a radiant heater for heating the multicolor image prior to transferring the image from the elongated-closed-loop-shaped member to a print medium.

15. The electrophotographic printing apparatus of claim 6 further comprising a charge erasure light disposed in the interior of the elongated-closed-loop-shaped member.

16. A method of multicolor electrophotographic printing, comprising the steps of:

providing a source of modulatable laser beams, a plurality of mirrors, an elongated-closed-loop-shaped member comprising a transparent substrate and a photoconductive layer, and a shared scanner disposed within the elongated-closed-loop-shaped member;

depositing charge onto the elongated-closed-loop-shaped member;

using the shared scanner to reflect each of the modulatable laser beams received from the source to at least one of the plurality of mirrors;

reflecting each of the modulatable laser beams from at least one of the plurality of mirrors to the photoconductive layer for selectively removing charge from the elongated-closed-loop-shaped member; and depositing toner at a plurality of locations along the elongated-closed-loop-shaped member, the toner adhering to the elongated-closed-loop-shaped member based on the remaining charge thereby creating a multicolor image.

17. A method of multicolor electrophotographic printing, comprising the steps of:

providing an elongated-closed-loop-shaped member comprising a transparent substrate, a photoconductive layer disposed over the transparent substrate and an opaque outermost layer disposed over the photoconductive layer;

depositing charge onto the elongated-closed-loop-shaped member;

exposing the photoconductive layer with light from a plurality of modulatable exposure sources disposed in the interior of the elongated-closed-loop-shaped member for selectively removing charge from the elongated-closed-loop-shaped member; and depositing toner at a plurality of locations along the elongated-closed-loop-shaped member, the toner adhering to the elongated-closed-loop-shaped member based on the remaining charge thereby creating a multicolor image.

18. A method of manufacturing an electrophotographic printing apparatus, comprising the steps of:

providing an elongated-closed-loop-shaped transparent substrate;

forming a photoconductive layer over the elongated-closed-loop-shaped transparent substrate;

forming an opaque outermost layer over the photoconductive layer;

disposing a plurality of charging stations adjacent to the elongated-closed-loop-shaped member for depositing charge thereon; and disposing a plurality of toning stations adjacent to the elongated-closed-loop-shaped member for depositing a toner onto the elongated-closed-loop-shaped member.

19. The method of claim 18 further comprising the step of providing a shared scanner within the interior of the elongated-closed-loop-shaped transparent substrate.

20. The method of claim 18 further comprising the step of providing a plurality of modulatable exposure sources within the interior of the elongated-closed-loop-shaped transparent substrate.

* * * * *